(12) United States Patent
Kim

(10) Patent No.: US 12,709,200 B2
(45) Date of Patent: Aug. 18, 2026

(54) SEAT FRAME

(71) Applicant: POSCO CO., LTD, Pohang-si (KR)

(72) Inventor: Jaehyun Kim, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 186 days.

(21) Appl. No.: 18/711,802

(22) PCT Filed: Nov. 30, 2022

(86) PCT No.: PCT/KR2022/019149
§ 371 (c)(1),
(2) Date: May 20, 2024

(87) PCT Pub. No.: WO2023/101382
PCT Pub. Date: Jun. 8, 2023

(65) Prior Publication Data

US 2025/0018839 A1 Jan. 16, 2025

(30) Foreign Application Priority Data

Dec. 1, 2021 (KR) ........................ 10-2021-0170261

(51) Int. Cl.
*B60N 2/16* (2006.01)
*B60N 2/02* (2006.01)
(Continued)

(52) U.S. Cl.
CPC ....... *B60N 2/1615* (2013.01); *B60N 2/02253* (2023.08); *B60N 2/0722* (2013.01); *B60N 2/14* (2013.01); *B60N 2/68* (2013.01)

(58) Field of Classification Search
CPC ...... B60N 2/16; B60N 2/615; B60N 2/02253; B60N 2/0722; B60N 2/14; B60N 2/68
(Continued)

(56) References Cited

U.S. PATENT DOCUMENTS 5,584,460 A * 12/1996 Ropp ..................... B60N 2/143 297/344.1
2014/0167468 A1* 6/2014 Haller .................... B60N 2/508 297/344.1

(Continued)

FOREIGN PATENT DOCUMENTS

BR 9300491 A 8/1993
CN 107662525 B * 5/2020 .............. F16C 19/49

(Continued)

OTHER PUBLICATIONS

Extended European Search Report dated Feb. 24, 2025 issued in corresponding to European Patent Application No. 22901740.5 (Note: KR 10-2020-0021618 A, KR 10-1819453 B1, KR 10-2020-0062425 A, KR 10-2020-0025321 A, JP H11-198692 A, and US 2021-0316639 A1 already submitted.).

(Continued)

*Primary Examiner* — Jose V Chen
(74) *Attorney, Agent, or Firm* — Morgan Lewis & Bockius LLP

(57) ABSTRACT

The present invention provides a seat frame comprising: a cushion part for supporting a cushion; a height-adjusting part which is provided below the cushion part, and which adjusts the height of the cushion part by means of a plurality of rotary links; a rotating part which is provided below the height-adjusting part, and which rotates the height-adjusting part and the cushion part; and reinforcing bracket parts which are coupled to the lower side of the rotating part so as to reinforce the rotating part, and which are provided over a pair of rails of a rail part arranged below same so as to be spaced apart.

11 Claims, 17 Drawing Sheets

(51) Int. Cl.
*B60N 2/07* (2006.01)
*B60N 2/14* (2006.01)
*B60N 2/68* (2006.01)

(58) Field of Classification Search
USPC .......................................... 297/344.1, 344.12
See application file for complete search history.

(56) References Cited

U.S. PATENT DOCUMENTS

| | | | | |
|---|---|---|---|---|
| 2015/0283928 | A1* | 10/2015 | Bauman ................. | B60N 2/525<br>248/636 |
| 2020/0062148 | A1 | 2/2020 | Yun et al. | |
| 2020/0101871 | A1* | 4/2020 | Garotte .................... | B60N 2/06 |
| 2020/0164772 | A1 | 5/2020 | Kong et al. | |
| 2021/0316639 | A1 | 10/2021 | Han et al. | |
| 2022/0024357 | A1* | 1/2022 | Lohar ...................... | B60N 2/02 |
| 2022/0274510 | A1 | 9/2022 | Kim et al. | |

FOREIGN PATENT DOCUMENTS

| | | | | | |
|---|---|---|---|---|---|
| GB | 2300119 | A | * | 10/1996 | ............. B60N 2/143 |
| JP | S6277031 | U | | 5/1987 | |
| JP | H06-27298 | U | | 4/1994 | |
| JP | H11-198692 | A | | 7/1999 | |
| JP | 2020-121711 | A | | 8/2020 | |
| JP | 2021-088246 | A | | 6/2021 | |
| KR | 980008730 | A | | 4/1998 | |
| KR | 10-2018-0002299 | A | | 1/2018 | |
| KR | 10-1819453 | B1 | | 1/2018 | |
| KR | 10-2020-0021618 | A | | 3/2020 | |
| KR | 10-2020-0025321 | A | | 3/2020 | |
| KR | 10-2020-0057910 | A | | 5/2020 | |
| KR | 10-2020-0062425 | A | | 6/2020 | |
| KR | 102148820 | B1 | * | 8/2020 | ............... B60N 2/14 |
| KR | 10-2021-0017721 | A | | 2/2021 | |
| KR | 10-2023-0080835 | A | | 6/2023 | |
| WO | 2021-111925 | A1 | | 6/2021 | |

OTHER PUBLICATIONS

Office Action dated Apr. 22, 2025 issued in corresponding Japanese Patent Application No. 2024-531081. (Note: JP H11-198692 A already submitted.).

International Search Report and Written Opinion dated Feb. 13, 2023 issued in International Patent Application No. PCT/KR2022/019149 (with English translation).

* cited by examiner

SEAT FRAME

CROSS-REFERENCE OF RELATED APPLICATIONS

This application is the U.S. National Phase under 35 U.S.C. § 371 of International Patent Application No. PCT/KR2022/019149, filed on Nov. 30, 2022, which in turn claims the benefit of Korean Application No. 10-2021-0170261, filed on Dec. 1, 2021, the disclosures of which applications are incorporated by reference herein.

TECHNICAL FIELD

The present disclosure relates to a seat frame.

BACKGROUND ART

It should be noted that the content described in this section merely provides background information on the present disclosure and does not constitute prior art.

In general, a seat used in a vehicle may include a seat frame including a cushion part supporting the occupant's buttocks from below, and a seat back supporting the occupant's back from behind.

The seat frame of the vehicle seat moves forward and backward or goes up and down on a rail part, and the seat back may be installed on the seat frame to be able to adjust an angle thereof to lie down or stand up.

Vehicle seats need to be able to adjust the height and rotate of the seat frame at the same time for the convenience of the occupants. However, to date, a seat frame that may stably satisfy load conditions such as collision or the like while allowing height adjustment and rotation of the seat frame has not been developed.

(Patent Document 1) KR 10-1998-0008730 A

SUMMARY OF INVENTION

Technical Problem

An aspect of the present disclosure is to provide a seat frame that may stably satisfy load conditions such as collisions or the like while allowing rotation and height adjustment.

Solution to Problem

According to an aspect of the present disclosure, a seat frame includes a cushion part having a cushion; a height-adjusting part installed on a lower side of the cushion part and adjusting a height of the cushion part via a plurality of rotating links; a rotating part installed below the height-adjusting part and rotating the height-adjusting part and the cushion part; and a reinforcing bracket part coupled to a lower side of the rotating part, reinforcing the rotating part, and installed across a pair of rails of a rail part disposed on a lower side and spaced apart from each other.

The height-adjusting part may include a first link connecting the rotating part and the cushion part at a front portion; and a second link connecting the rotating part and the cushion part at a rear portion.

The rotating part may include a fixed plate disposed on a lower side; a base plate joined to an upper side of the fixed plate; and a rotating plate rotatably installed between the fixed plate and the base plate.

The rotating part may further include a connection bracket having one side coupled to an upper side of the rotating plate and the other side coupled to the first link and the second link.

The connection bracket may have a first connection reinforcing portion installed in front of the connection bracket and forming a closed cross-section with the connection bracket.

The connection bracket may have a second connection reinforcing portion installed at a rear portion of the connection bracket and forming a closed cross-section with the connection bracket.

The connection bracket may be provided with a seat belt fixed to a rear upper side thereof, and the second connection reinforcing portion is coupled to a rear lower side of the connection bracket.

The rotating part may further include a motor plate fixed to an upper side of the rotating plate; and a motor member installed on the motor plate and equipped with a drive gear engaged with a big gear fixed to the base plate.

The reinforcing bracket part may include a bracket plate installed across the pair of rails and comprised of a single member coupled to the fixed plate; and a bracket reinforcing member coupled between the fixed plate and the bracket plate and comprised of a single member reinforcing the bracket plate.

The bracket plate may be reinforced by overlapping the bracket reinforcing member on an upper side thereof, and the fixed plate of the rotating part is coupled to an upper side of the bracket reinforcing member.

The bracket plate, the bracket reinforcing member, and the fixed plate of the rotating part may have lengths corresponding to each other in a front-to-back direction, and may have longitudinal overlapping sections overlapping and fixed to each other in a up and down direction.

The bracket reinforcing member may extend in a front-to-back direction along the rails, and may have a reinforcing bead protruding upwardly in front of the bracket reinforcing member.

The reinforcing bead may be disposed on a lower side of the rotating plate, when taken in plan view.

Advantageous Effects of Invention

According to an embodiment of the present disclosure, there is an effect of stably satisfying load conditions such as collisions or the like while allowing rotation and height adjustment.

BEST MODE FOR INVENTION

Figure 1:
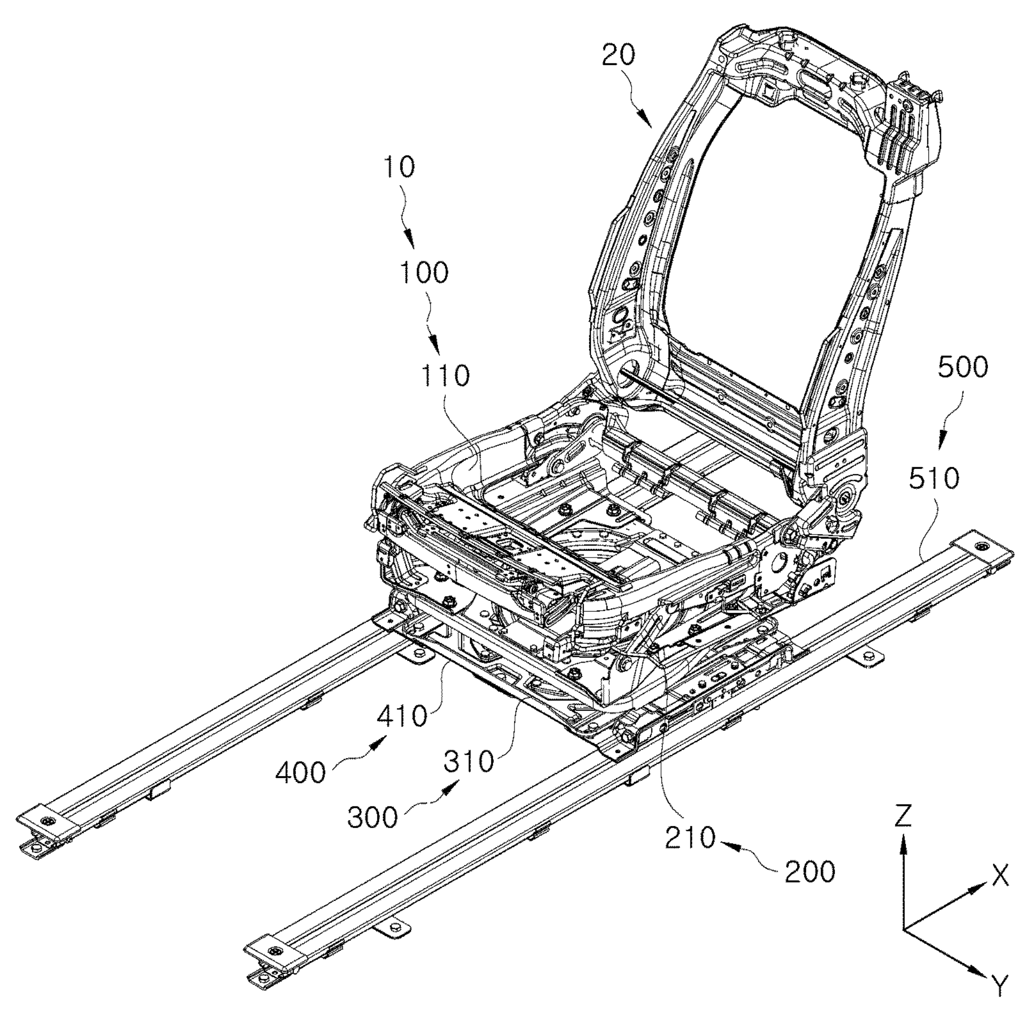
FIG. 1 is a perspective view illustrating a seat in which a seat frame and a seat back of the present disclosure are combined.

Hereinafter, preferred embodiments of the present disclosure will be described with reference to the attached drawings. However, embodiments of the present disclosure may be modified in various other forms, and the scope of the present disclosure is not limited to the embodiments described below. Additionally, the embodiments of the present disclosure are provided to more completely explain the present disclosure to those with average knowledge in the relevant technical field. The shapes and sizes of elements in drawings may be exaggerated for clearer explanation.

Referring to the drawings, the seat frame of the present disclosure is illustrated in the left and right direction, up and down direction, and front-to-back direction, and the terminology of left and right direction, up and down direction, and front-to-back direction is also used in the detailed description of the invention, but this is for convenience of explanation, and it should be noted that the technical features of the seat frame of the present disclosure are not limited to this direction.

Hereinafter, the X-axis illustrated in the attached drawings is the front-to-back direction of the seat frame, the Y-axis is the left and right direction of the seat frame, and the Z-axis is the up and down direction of the seat frame.

Hereinafter, components included in a seat frame 10 according to an embodiment of the present disclosure will be described in detail with reference to FIGS. 1 to 6.

The seat frame 10 according to an embodiment of the present disclosure may include a cushion part 100, a height-adjusting part 200, a rotating part 300, and a reinforcing bracket part 400.

FIG. 1 is a perspective view illustrating a seat in which the seat frame 10 and a seat back 20 of the present disclosure are combined.

Figure 2A:
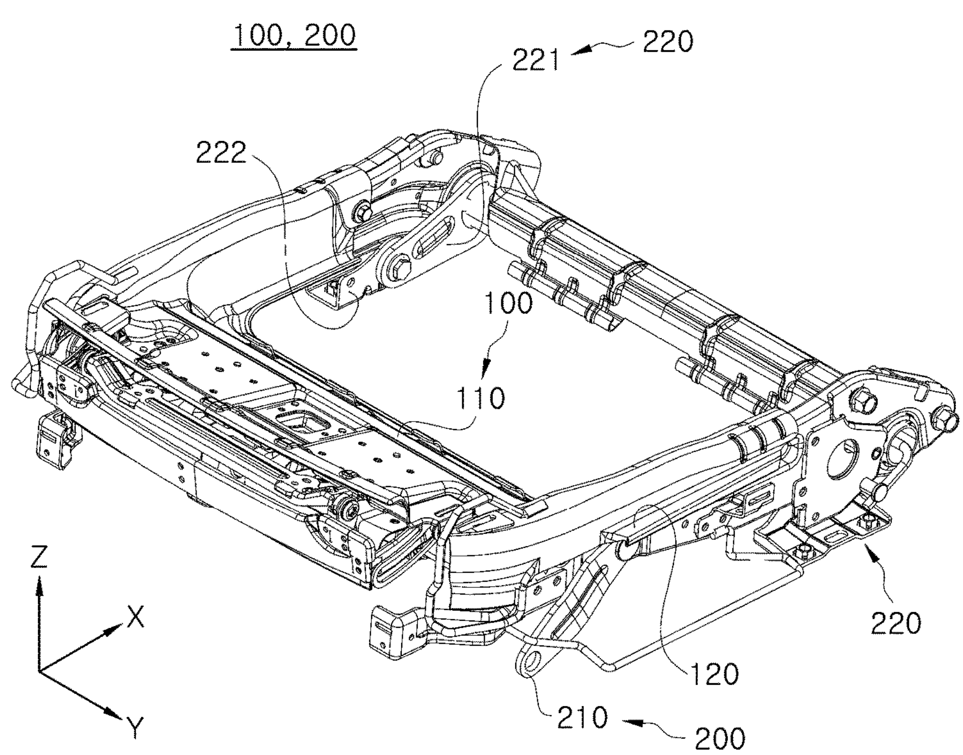
FIGS. 2A and 2B are diagrams illustrating an operating state of a height-adjusting part of a seat frame of the present disclosure.
Figure 2B:
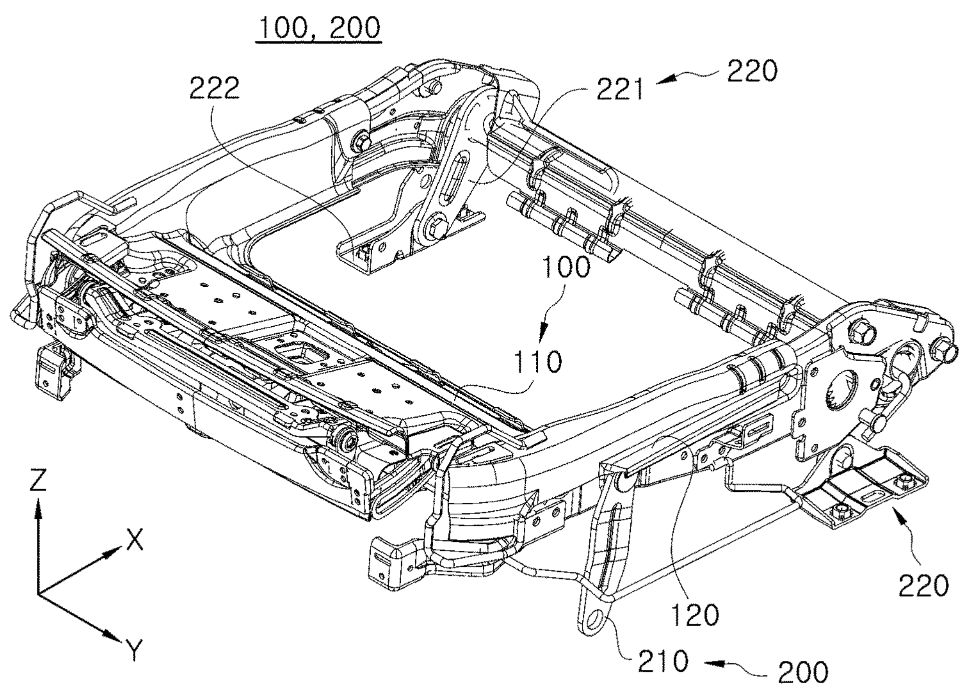
Figure 3:
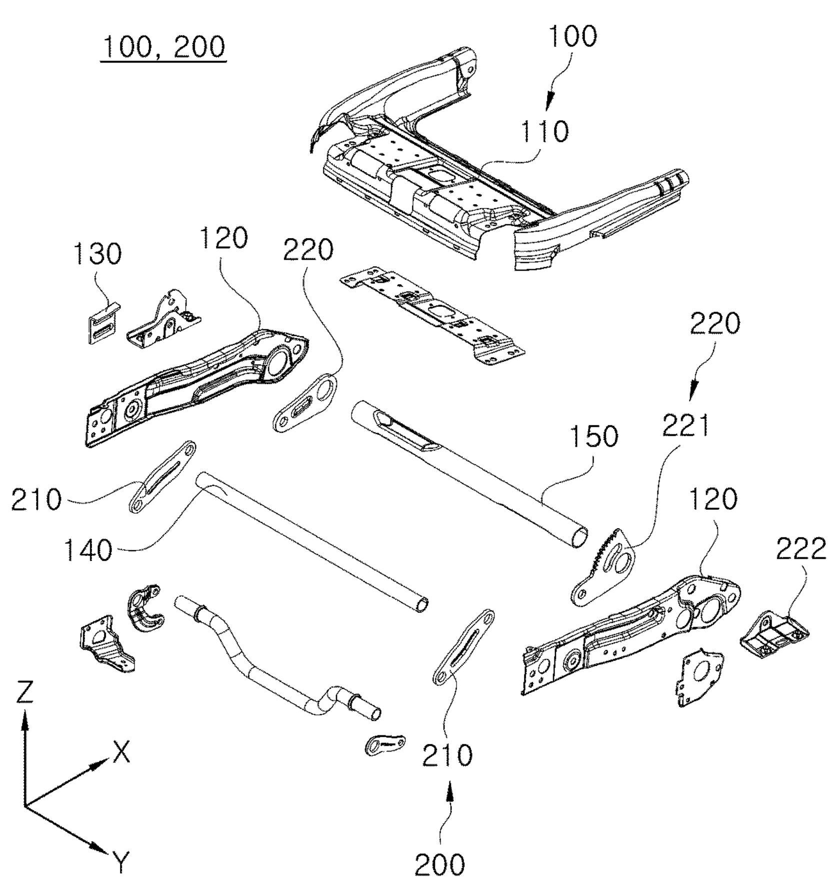
FIG. 3 is a perspective view of a cushion part and a height-adjusting part of a seat frame of the present disclosure in an exploded state.

FIGS. 2A and 2B are diagrams illustrating the operating state of the height-adjusting part 200 of the seat frame 10 of the present disclosure, and FIG. 3 is a perspective view of the cushion part 100 and the height-adjusting part 200 of the seat frame 10 of the present disclosure in an exploded state.

Figure 4A:
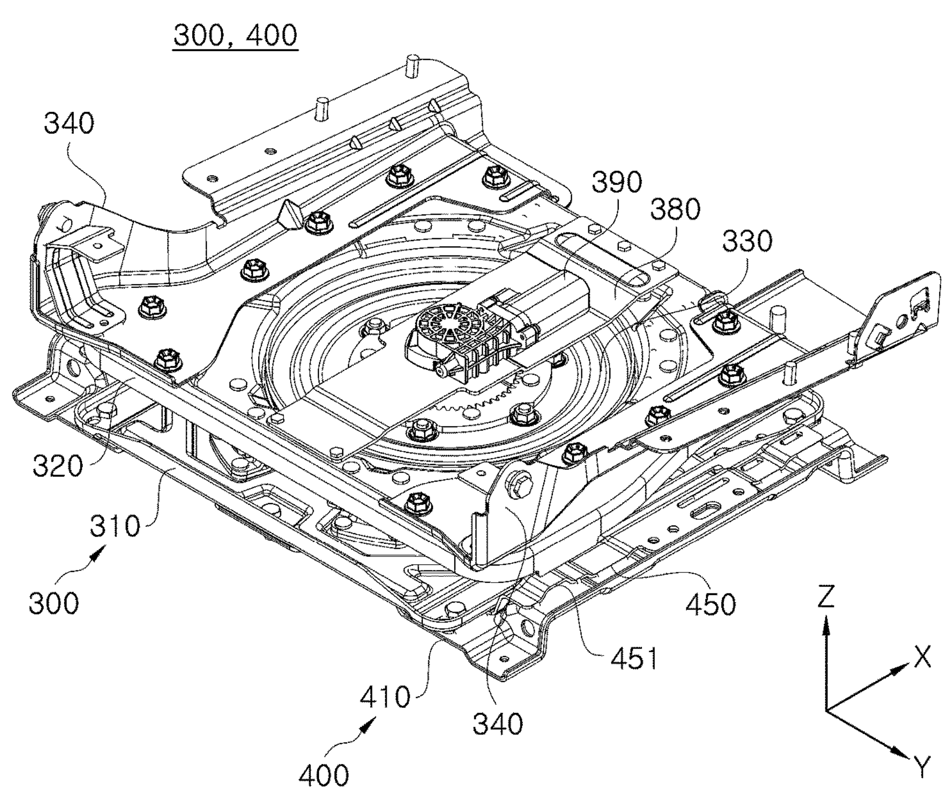
FIGS. 4A and 4B are diagrams illustrating an operating state of a rotating part of a seat frame of the present disclosure.
Figure 4B:
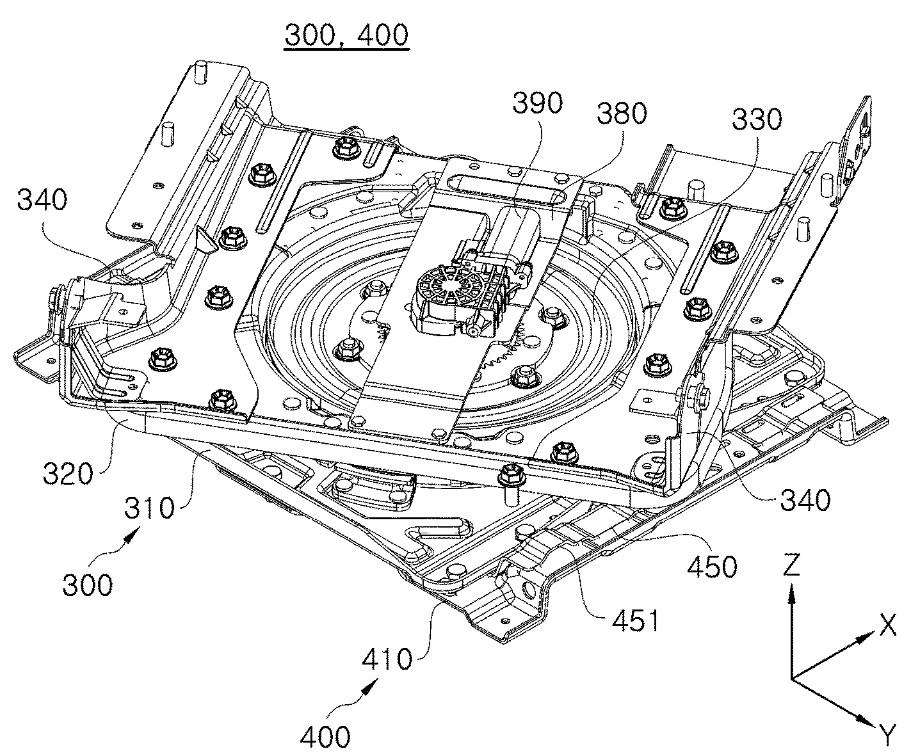
Figure 5:
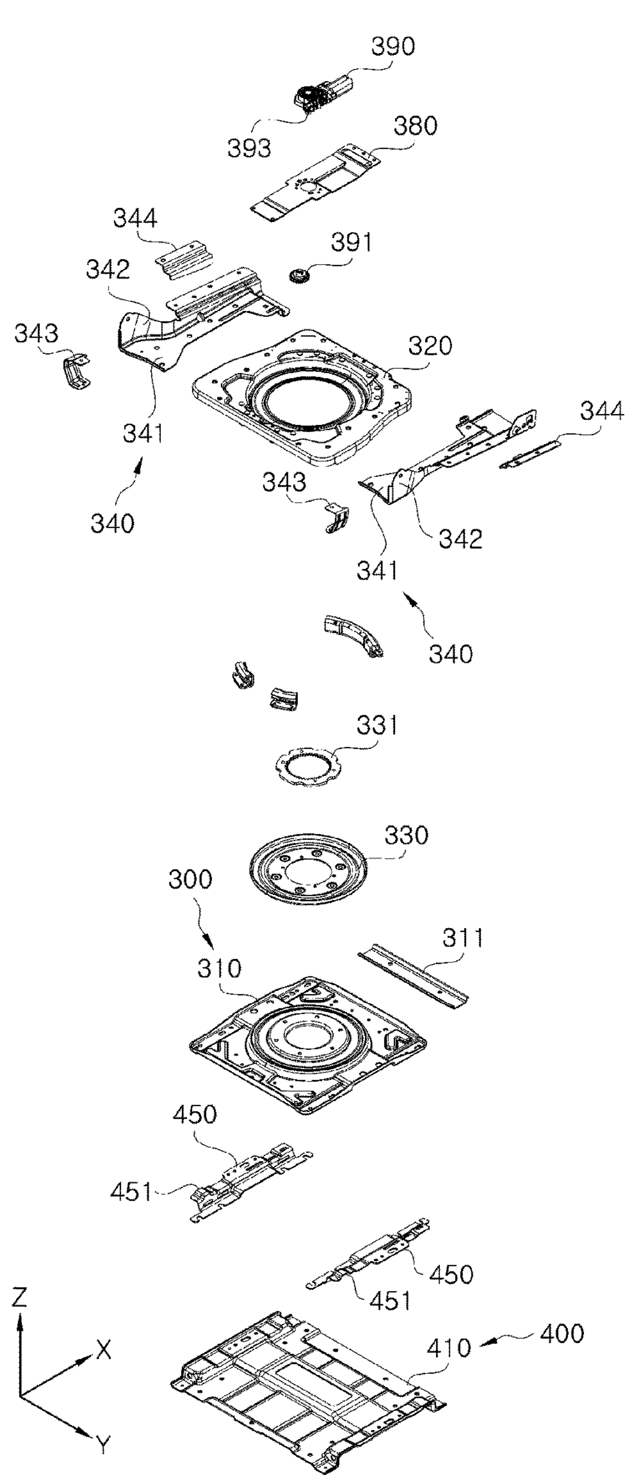
FIG. 5 is a perspective view of a rotating part and a reinforcing bracket part of a seat frame of the present disclosure in an exploded state.
Figure 6:
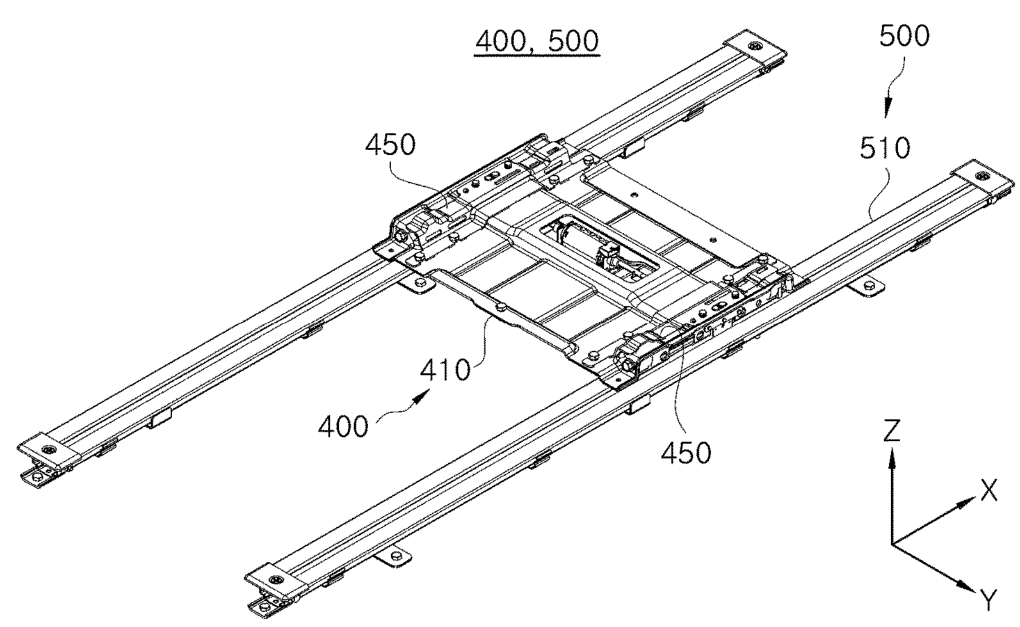
FIG. 6 is a perspective view of a reinforcing bracket part and a rail part of a seat frame of the present disclosure.

FIGS. 4A and 4B are diagrams illustrating the operating state of the rotating part 300 of the seat frame 10 of the present disclosure, FIG. 5 is a perspective view of the rotating part 300 and the reinforcing bracket part 400 of the seat frame 10 of the present disclosure in an exploded state, and FIG. 6 is a perspective view of the reinforcing bracket part 400 and a rail part 500 of the seat frame 10 of the present disclosure.

The cushion part 100 may support a cushion. The cushion part 100 may be installed with a cushion for the driver to sit on, and the cushion part 100 is rotatably fixed to the seat back of the seat so that the angle of the seat back 20 may be adjusted.

The cushion part 100 may include components such as a cushion panel 110, a cushion side frame 120, a cushion side patch 130, a front pipe 140, a rear pipe 150, and the like.

The front pipe 140 of the cushion part 100 is installed in front of the cushion part 100 to reinforce the cushion part 100, and the front pipe 140 may extend in the left and right directions.

The rear pipe 150 of the cushion part 100 may be installed at the rear of the cushion part 100 to reinforce the cushion part 100, and the rear pipe 150 may extend in the left and right directions and may be installed by penetrating through a second link member 221 of the height-adjusting part 200, which will be described later.

The height-adjusting part 200 is installed on the lower side of the cushion part 100, and may adjust the height of the cushion part 100 via a plurality of links. As an example, the link may include a first link 210 and a second link 220.

The rotating part 300 is installed below the height-adjusting part 200 and may rotate the height-adjusting part 200 and the cushion part 100.

The reinforcing bracket part 400 is coupled to the lower side of the rotating part 300 to reinforce the rotating part 300, and may be installed across a pair of rails 510 of the spaced apart rail part 500 located on the lower side.

The reinforcing bracket part 400 may be installed across a pair of rails 510 disposed to be spaced apart in the left and right directions. The reinforcing bracket part 400 is fixed to a slide bracket 520 of the rail part 500, and the slide bracket 520 may be movably installed on the upper side of the rail 510.

The rail part 500 is installed so that the seat frame may move in the forward and backward directions, and the rotating part 300 may be movably installed on the rail part 500.

The lower part of the rail part 500 may be fixed to the floor inside the vehicle, and the rotating part 300 may be fixed to the upper part thereof. A pair of rails 510 may be installed in the rail part 500, and the slide bracket 520 may be installed on the upper side of the pair of rails 510.

The height-adjusting part 200 may include the first link 210 and the second link 220.

The first link 210 may connect the rotating part 300 and the cushion part 100 at the front. The lower part of the first link 210 is connected to the front of the rotating part 300, and the upper part thereof may be connected to the front of the cushion part 100. The first link 210 may be installed in pairs spaced apart in the left and right directions.

The upperside of the first link 210 is rotatably coupled to the cushion part 100, and the lower side thereof may be rotatably coupled to the rotating part 300. Specifically, the lower side of the first link 210 may be rotatably coupled to a connection bracket 340 of the rotating part 300.

The second link 220 may connect the rotating part 300 and the cushion part 100 at the rear. The lower part of the second link 220 is connected to the rear of the rotating part 300, and the upper part thereof may be connected to the rear of the cushion part 100. The second link 220 may be installed in pairs spaced apart in the left and right directions.

The second link 220 may include a second link member 221 and a second link bracket 222.

The upper side of the second link member 221 is rotatably coupled to the cushion part 100, and the lower side thereof may be rotatably coupled to the rotating part 300.

The second link bracket 222 is fixed to the upper side of the rotating part 300, and may be rotatably coupled to the lower side of the second link member 221. The second link member 221 and the second link bracket 222 disposed on the left and the second link member 221 and the second link bracket 222 disposed on the right may have slightly different shapes.

The rotating part 300 may include a fixed plate 310, a base plate 330, and a rotating plate 320.

The fixed plate 310 may be disposed in the lower side of the rotating part 300. A fixing reinforcing portion 311 is attached to the lower side of the fixed plate 310 to form a closed cross-section, thereby reinforcing the rigidity of the fixed plate 310.

The base plate 330 may be joined to the upper side of the fixed plate 310.

The rotating plate 320 may be disposed on the upper side of the rotating part 300. The rotating plate 320 may rotate on the upper side of the fixed plate 310.

The rotating plate 320 may be installed between the fixed plate 310 and the base plate 330 to be rotatable in the circumferential direction. The rotating plate 320 may be prevented from being separated by the fixed plate 310 therebelow and the base plate 330 thereabove, and may rotate in the circumferential direction based on a rotation axis in the up and down direction.

A ball bearing may be disposed between the rotating plate 320 and the fixed plate 310 therebelow. The fixed plate 310, the ball bearing, and the rotating plate 320 may be disposed sequentially from the bottom.

A ball bearing may be disposed between the rotating plate 320 and the base plate 330 thereabove. The rotating plate 320, the ball bearing, and the base plate 330 may be disposed sequentially from the bottom.

A ball bearing is provided between the fixed plate 310 and the rotating plate 320, so that the rotating plate 320 may be rotated with minimal rotational resistance. A ball bearing is provided between the base plate 330 and the rotating plate 320, so that the rotating plate 320 may be rotated with minimal rotation resistance.

The rotating part 300 may further include the connection bracket 340.

One side of the connection bracket 340 may be coupled to the upper side of the rotating plate 320, and the other side thereof may be coupled to the first link 210 and the second link 220. A pair of connection brackets 340 may be installed to be spaced apart in the left and right directions.

The connection bracket 340 may include a connection bottom plate 341 and a connection side plate 342.

The connection bottom plate 341 is coupled to the upper side of the rotating plate 320 and may be formed to extend in the transverse direction. The connection side plate 342 extends in the longitudinal direction to cross one side of the connection bottom plate 341, and may be coupled to the first link 210 and the second link 220.

The lower portion of the first link 210 may be rotatably coupled to the front of the connection side plate 342, and the lower portion of the second link 220 may be rotatably coupled to the rear of the connection side plate 342. The first link 210 and the second link 220 may be coupled to the upper region of the connection side plate 342 in the up and down direction.

A pair of connection brackets 340 are installed on the upper side of the rotating plate 320, to be spaced apart in the left and right directions, and the connection side plate 342 may be formed to extend upwardly from the connection bottom plate 341 in a crossing direction.

Figure 7:
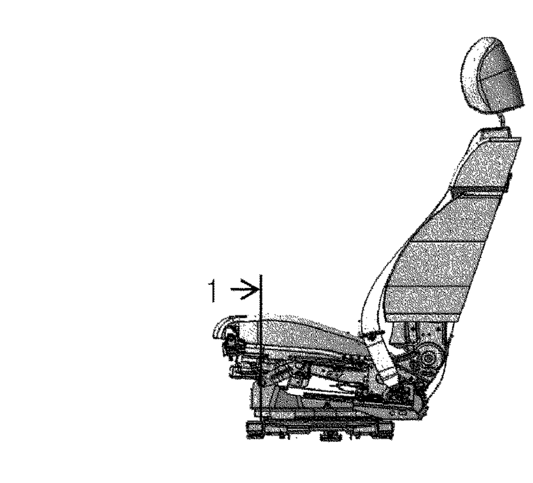
FIG. 7 is a cross-sectional view in a '1' direction of a seat frame of the present disclosure.
Figure 7:
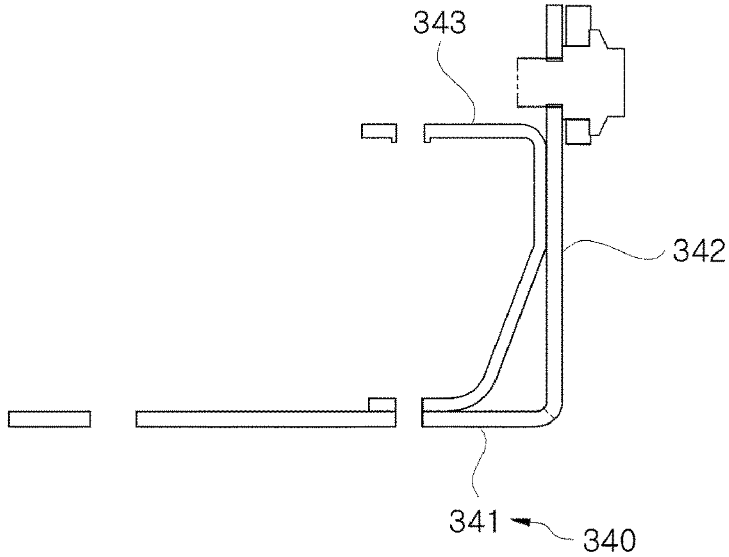

FIG. 7 is a cross-sectional view in the '1' direction of the seat frame 10 of the present disclosure.

The connection bracket 340 may have a first connection reinforcing portion 343 that is installed in front of the connection bracket 340 and forms a closed cross-section with the connection bracket 340.

The first connection reinforcing portion 343 is installed in front of the connection bracket 340 and may be fixed to the inner surface of the connection bracket 340 in the left and right directions. The first connection reinforcing portion 343 may forma closed cross-section together with the connection bottom plate 341 and the connection side plate 342 of the connection bracket 340.

The connection bottom plate 341 and the connection side plate 342 of the connection bracket 340 together have an 'L-shaped' cross-section, and the first connection reinforcing portion 343 may have an 'L-shaped' cross-section with an inclined section formed in the corner portion. A closed cross-section in the shape of a right triangle may be formed between the inclined section of the first connection reinforcing portion 343 and the connection bracket 340.

The first connection reinforcing portion 343 is installed around the first link 210 to reinforce the rigidity of the peripheral portion where the first link 210 is coupled.

The first link 210 may be coupled to the front of the connection bracket 340. At this time, the first connection reinforcing portion 343 forms a closed cross-section together with the connection bracket 340 to reinforce the rigidity of the peripheral portion where the first link 210 is coupled.

The first link 210 is coupled to the upper side of the connection bracket 340 in the height direction, and the first connection reinforcing portion 343 may be coupled to the lower side of the portion to which the first link 210 is coupled, so as not to cause interference with the first link 210.

Figure 8:
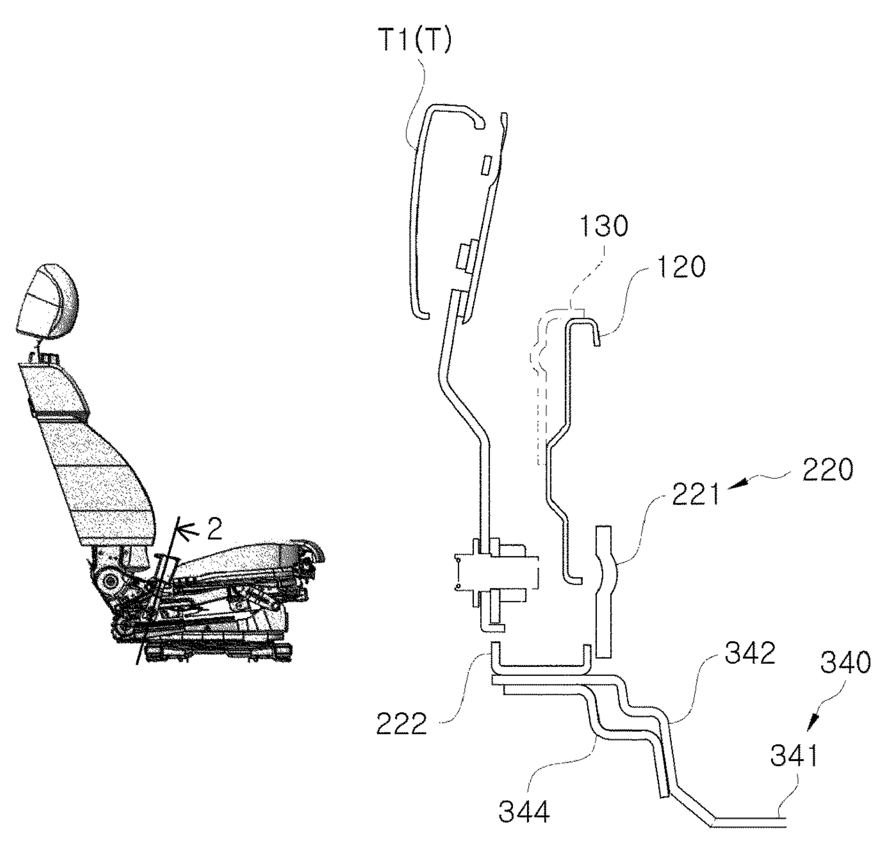
FIG. 8 is a cross-sectional view in a '2' direction of a seat frame of the present disclosure.
Figure 9:
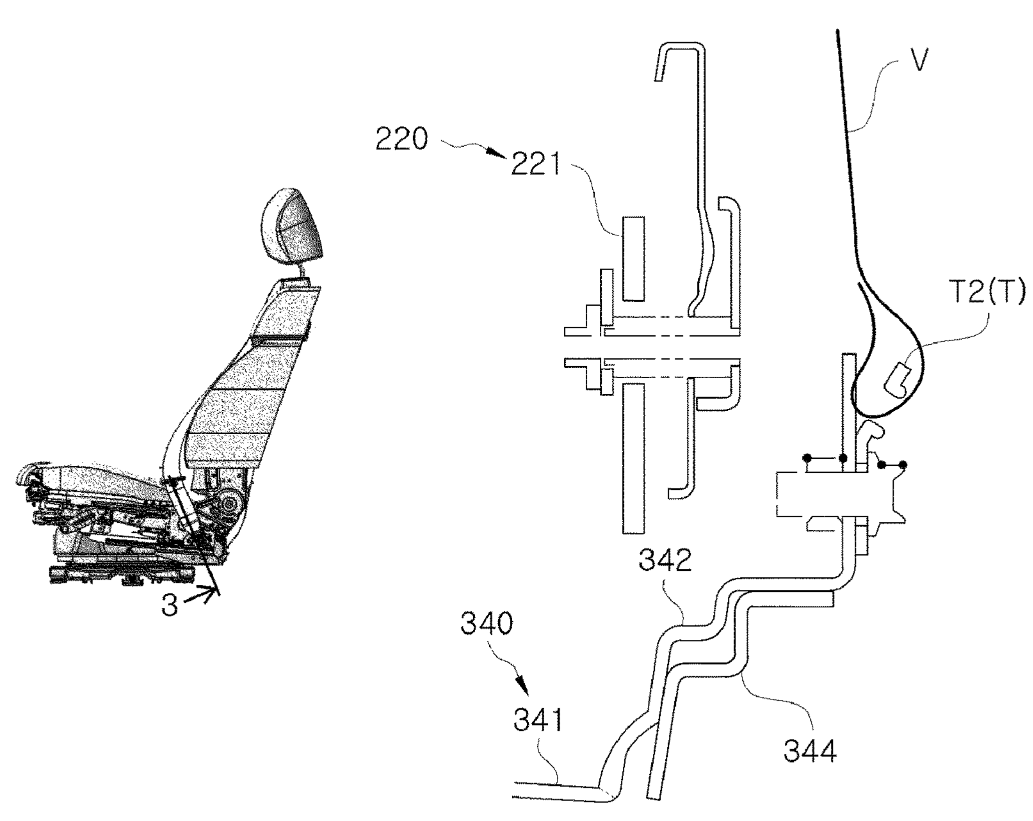
FIG. 9 is a cross-sectional view in a '3' direction of a seat frame of the present disclosure.

FIG. 8 is a cross-sectional view in the '2' direction of the seat frame 10 of the present disclosure, and FIG. 9 is a cross-sectional view in the '3' direction of the seat frame of the present disclosure.

The connection bracket 340 may have a second connection reinforcing portion 344 that is installed at the rear of the connection bracket 340 and forms a closed cross-section together with the connection bracket 340.

The second connection reinforcing portion 344 is installed at the rear of the connection bracket 340, and may be fixed to the outer surface of the connection bracket 340 in the left and right directions. The second connection reinforcing portion 344 may form a closed cross-section together with the connection side plate 342 of the connection bracket 340.

When the connection bracket 340 and the second connection reinforcing portion 344 forma closed cross-section, in the closed cross-section portion, the connection bracket 340 may have a 'step-shaped' cross-section and the second connection reinforcing portion 344 may have an 'L-shaped' cross-section.

The second connection reinforcing portion 344 is installed around the second link 220 to reinforce the rigidity of the peripheral portion to which the second link 220 is coupled.

The rotating plate 320, the connection bracket 340, and the second link 220 may be sequentially connected and fixed from the bottom to the top. Accordingly, the second connection reinforcing portion 344 may be coupled to the rear lower side of the connection bracket 340 and may not cause interference with the second link 220 connected to the upper side of the connection bracket 340. The second connection reinforcing portion 344 may form a closed cross-section with the connection bracket 340 to reinforce the rigidity of the peripheral portion to which the second link 220 is coupled.

A belt fixture (T) is fixed to the rear upper side of the connection bracket 340, and the second connection reinforcing portion 344 may be coupled to the rear lower side of the connection bracket 340.

A pair of connection brackets 340 may be installed to be spaced apart in the left and right directions, and the belt fixture (T) to which a seat belt (V) is fixed may respectively be formed on the rear upper sides of the connection brackets 340 on both sides.

The belt fixture (T) disposed on the left and the belt fixture (T) disposed on the right may have slightly different shapes. The belt fixture (T) placed on the right is a seat belt buckle (T1, see FIG. 8), and the belt fixture (T) placed on the left is a seat belt anchor (T2, see FIG. 9), and the two may have different shapes.

The cushion side patch 130 is combined with the cushion side frame 120 to form a closed cross-section, so that rigidity may be strengthened, the seat belt buckle (T1) may be coupled to the second link bracket 222, and the second link bracket 222 may be fixed to the upper side of the connection side plate 342 of the connection bracket 340.

The second connection reinforcing portion 344 is installed around the belt fixture (T), and forms a closed cross-section with the connection bracket 340, to reinforce the rigidity around the belt fixture (T) to which the seat belt (V) is fixed.

The belt fixture (T) is installed on the rear upper side of the connection bracket 340, and the second connection reinforcing portion 344 is installed on the lower side of the connection bracket 340 so that the second connection reinforcing portion 344 does not interfere with the belt fixture (T).

Figure 10:
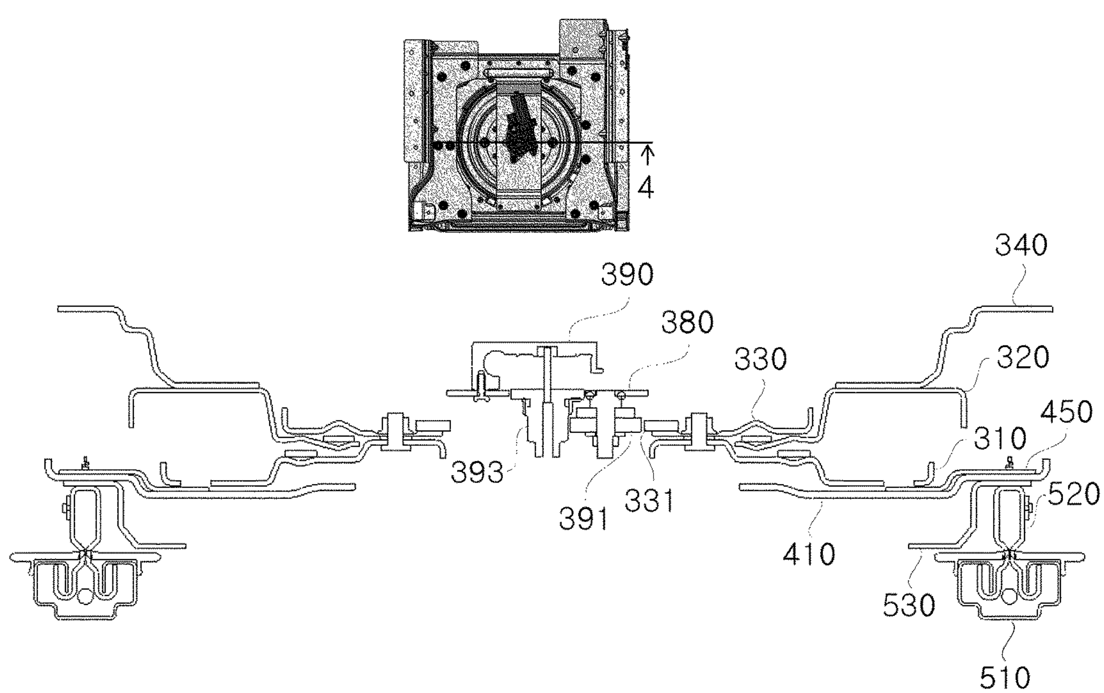
FIG. 10 is a cross-sectional view in a '4' direction of a seat frame of the present disclosure.

FIG. 10 is a cross-sectional view of the seat frame 10 of the present disclosure in the '4' direction.

One side of the base plate 330 is coupled to the upper side of the fixed plate 310, and the other side thereof is installed to cover the upper portion of the rotating plate 320 disposed on the upper side of the fixed plate 310, to prevent the rotating plate 320 from being separated.

The rotating part 300 may further include a motor plate 380 and a motor member 390.

The motor plate 380 may be fixed to the upper side of the rotating plate 320.

The motor member 390 may be installed on the motor plate 380 and have a drive gear 391 meshed with a big gear 331 fixed to the base plate 330. The big gear 331 has a gear surface formed on the inner peripheral surface thereof, and the drive gear 391 may be placed inside the big gear 331 and meshed therewith.

The rotating plate 320 may be rotatably disposed between the fixed plate 310 and the base plate 330. The motor plate 380 on which the motor member 390 is installed may be fixed to the upper side of the rotating plate 320. As the drive gear 391 of the motor member 390 rotates while engaged with the big gear 331 coupled to the base plate 330, the motor plate 380 on which the motor is installed and the rotating plate 320 coupled to the motor plate 380 may be rotated.

The drive gear 391 is meshed with a rotating gear 393 installed on the rotation axis of the motor member 390 and receives rotational force from the motor member 390, and the drive gear 391 may be meshed with the big gear 331.

A pair of connection brackets 340 and the motor plate 380 may be installed on the upper side of the rotating plate 320. A pair of connection brackets 340 are installed on the upper side of the rotating plate 320, to be spaced apart in the left and right directions, and the motor plate 380 extending in the forward and backward directions may be disposed in the center portion in the left and right directions between the pair of connection brackets 340. As the connection side plate 342 of the connection bracket 340 extends upwardly from the connection bottom plate 341 in a direction crossing therewith, a space for installation of the motor member 390 may be secured on the upper side of the motor plate 380.

Figure 11:
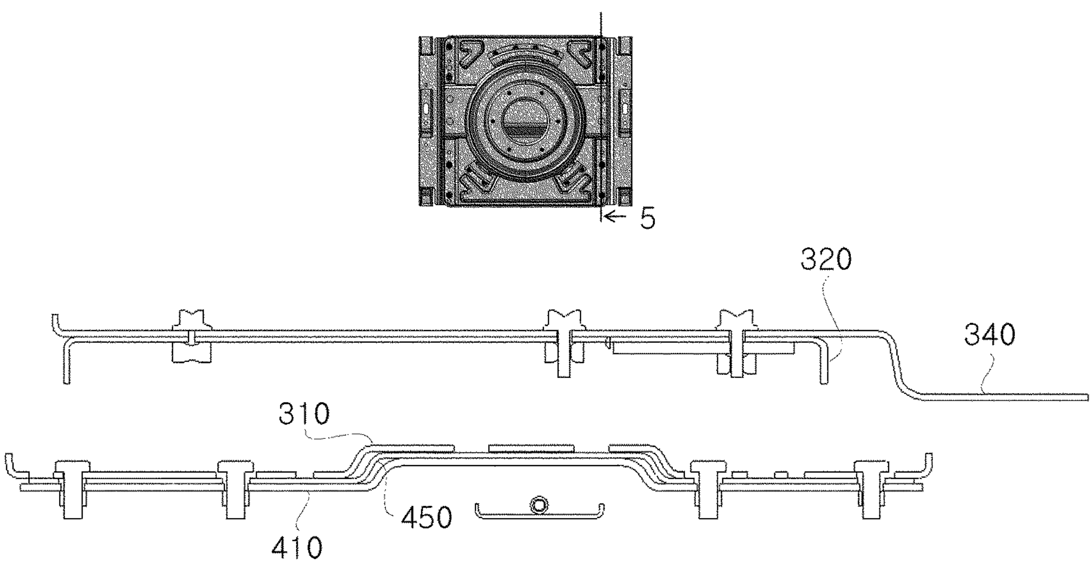
FIG. 11 is a cross-sectional view in a '5' direction of a seat frame of the present disclosure.

FIG. 10 is a cross-sectional view of the seat frame of the present disclosure in the '4' direction, and FIG. 11 is a cross-sectional view of the seat frame 10 of the present disclosure in the '5' direction.

The reinforcing bracket part 400 may include a bracket plate 410 and a bracket reinforcing member 450.

The bracket plate 410 is installed across a pair of rails 510, and may be comprised of a single member coupled to the fixed plate 310. The bracket plate 410 may be extended so that left and right ends thereof are disposed on the upper sides of the rails 510 on both sides.

A motor bracket 530, a slide bracket 520, and a rail 510 may be placed on the lower side of the bracket plate 410.

The slide bracket 520 may be movably installed on the rail 510, and the slide bracket 520 forms a locking structure with the rail 510, so that the slide bracket 520 may be prevented from being separated from the rail 510.

The bracket reinforcing member 450 is coupled between the fixed plate 310 and the bracket plate 410 and may be comprised of a single member that reinforces the bracket plate 410.

The bracket reinforcing member 450 may be comprised of a single member coupled between the fixed plate 310 and the bracket plate 410.

A pair of bracket reinforcing members 450 may be installed on the bracket plate 410. The bracket reinforcing member 450 may be coupled to the left and right sides of the bracket plate 410, respectively.

The upper side of the bracket plate 410 is reinforced by overlapping the bracket reinforcing member 450, and the fixed plate 310 of the rotating part 300 may be coupled to the upper side of the bracket reinforcing member 450.

The upper side of the bracket plate 410 is reinforced by being combined with the bracket reinforcing member 450, and the motor bracket 530 and the slide bracket 520 may be coupled to the lower side of the bracket plate 410 reinforced by the bracket reinforcing member 450.

The slide bracket 520, the motor bracket 530, the bracket plate 410, and the bracket reinforcing member 450 are disposed in order from the bottom to the top, and the fixed plate 310 may be coupled to the upper side of the bracket reinforcing member 450.

The bracket plate 410, the bracket reinforcing member 450, and the fixed plate 310 of the rotating part 300 have lengths corresponding to each other in the front-to-back direction, and may be formed by overlapping each other in the up and down direction to form a fixed longitudinal overlap section.

The bracket plate 410, the bracket reinforcing member 450, and the fixed plate 310 of the rotating part 300 may be fixed via bolts while overlapping each other in the up and down direction. The fixed plate 310 may be coupled to the bracket plate 410 reinforced by the bracket reinforcing member 450.

Figure 12:
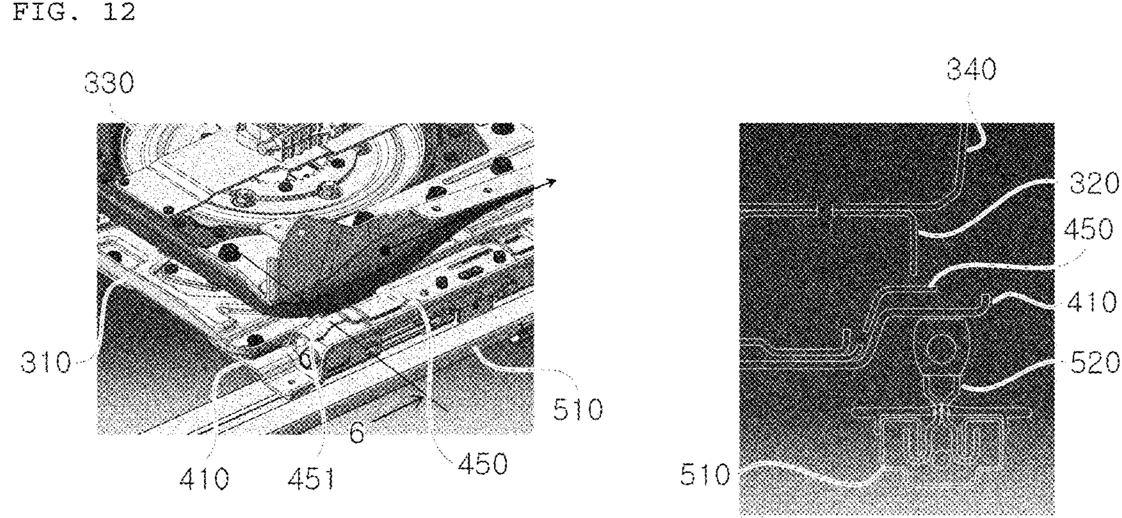
FIG. 12 is a perspective view and a cross-sectional view of a portion in which reinforcing beads are formed, in a '6' direction, in a seat frame of the present disclosure.

FIG. 12 is a perspective view and a cross-sectional view of the portion where reinforcing bead 451 is formed in the seat frame 10 of the present disclosure, in the '6' direction.

The bracket reinforcing member 450 extends in the front-to-back direction along the rail 510, and may have a reinforcing bead 451 protruding upward in front of the bracket reinforcing member 450. The bracket reinforcing member 450 may be comprised of a single member installed in the front-to-back direction, which is the longitudinal direction of the rail 510.

The reinforcing beads 451 may include a protruding surface protruding upwardly, and an inclined surface formed on both sides of the protruding surface in the front-to-back direction and sloping downward in the front to back direction.

By forming the reinforcing bead 451 protruding upward in front of the bracket reinforcing member 450, the slide bracket 520 may be installed to be movable on the rail 510, and the slide bracket 520 forms a locking structure with the rail 510, so that the slide bracket 520 may be prevented from being separated from the rail 510.

Figure 13:
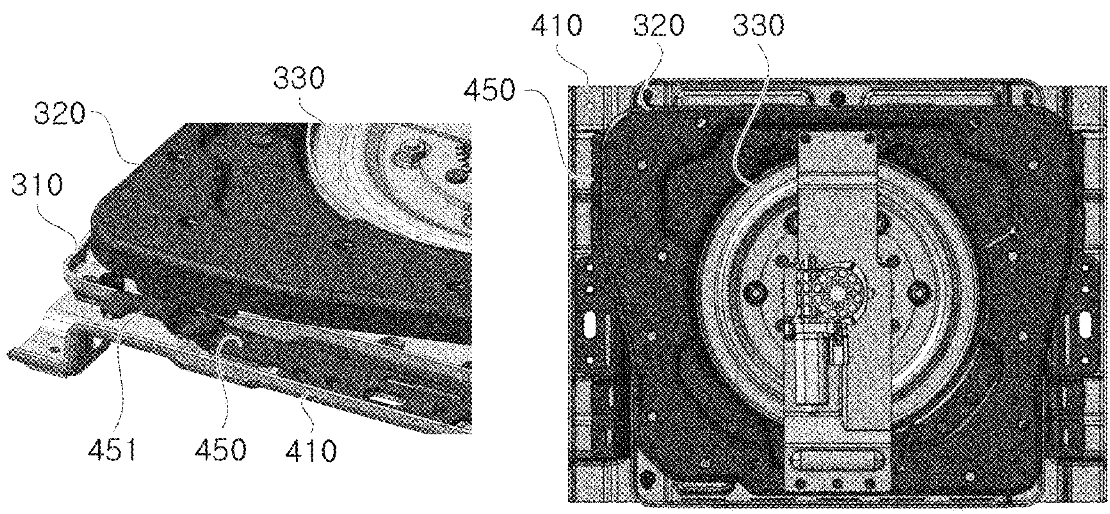
FIG. 13 is a perspective view and a plan view of a portion in which reinforcing beads are formed in a seat frame of the present disclosure.

FIG. 13 is a perspective view and a plan view of the portion where the reinforcing bead 451 is formed in the seat frame 10 of the present disclosure.

The reinforcing bead 451 may be disposed on the lower side of the rotating plate 320 in a plane view.

In a plane view, the left-right length of the front area of the rotating plate 320 may be longer than the left-right length of the rear area. In addition, the rotating plate 320 may have left and right ends disposed above the reinforcing bead 451 in the front area.

By placing the rotating plate 320 on the upper side of the reinforcing bead 451 on a plane, when the rotating plate 320 is deformed, the rotating plate 320 is caught by the reinforcing bead 451 such that the lower portion of the rotating plate 320 may be supported, thereby preventing the rotating plate 320 from being excessively deformed.

By shortening the left and right lengths of the rear area of the rotating plate 320 on a plane, the size of the rotating plate 320 may be reduced, which has the effect of reducing the weight of the part.

Hereinafter, with reference to FIGS. 14A to 15B, the effect of installing the bracket reinforcing member 450 and the reinforcing bead 451 of the bracket reinforcing member 450 in an embodiment of the present disclosure will be compared with the comparative example.

Figure 14A:
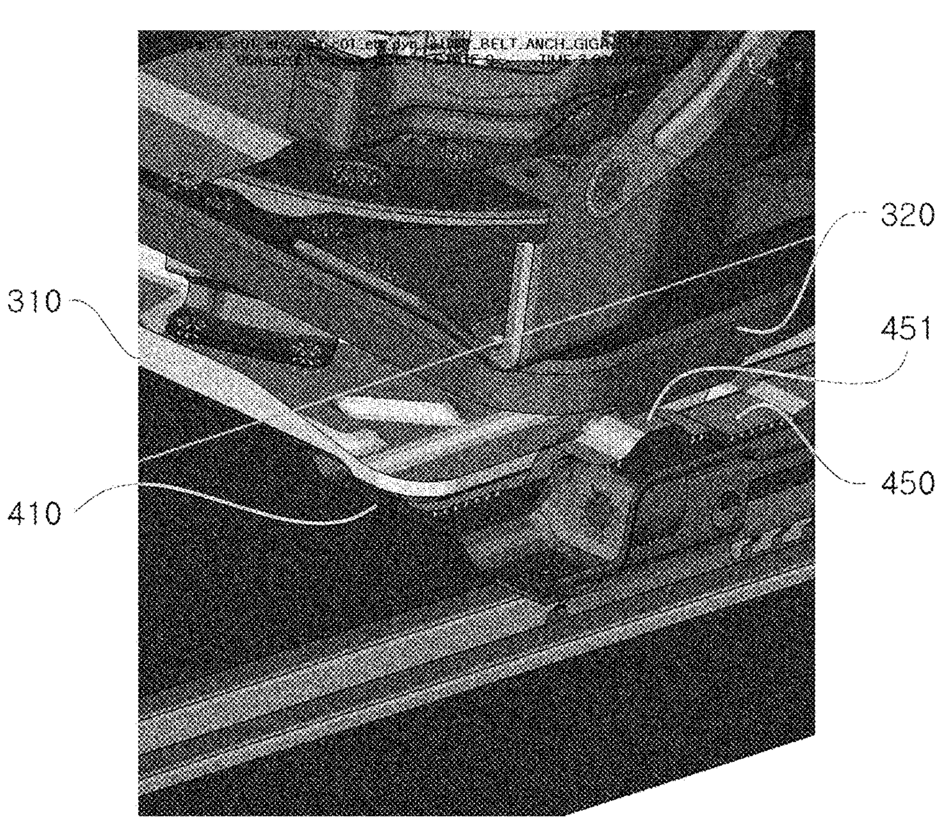
FIGS. 14A and 14B illustrate results of deformation analysis of the seat frame of an embodiment of the present disclosure.
Figure 14B:
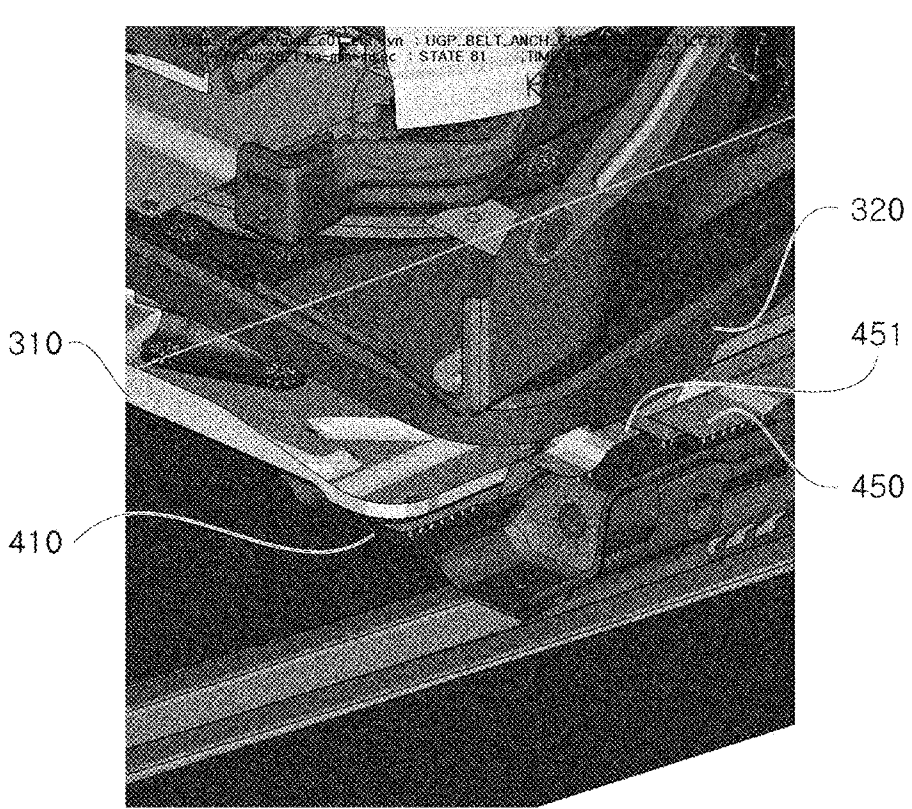

FIGS. 14A and 14B are deformation analysis results of the seat frame 10 according to an embodiment of the present disclosure. FIG. 14A is the initial deformation analysis result of the example, and FIG. 14B is the later deformation analysis result of the example.

Figure 15A:
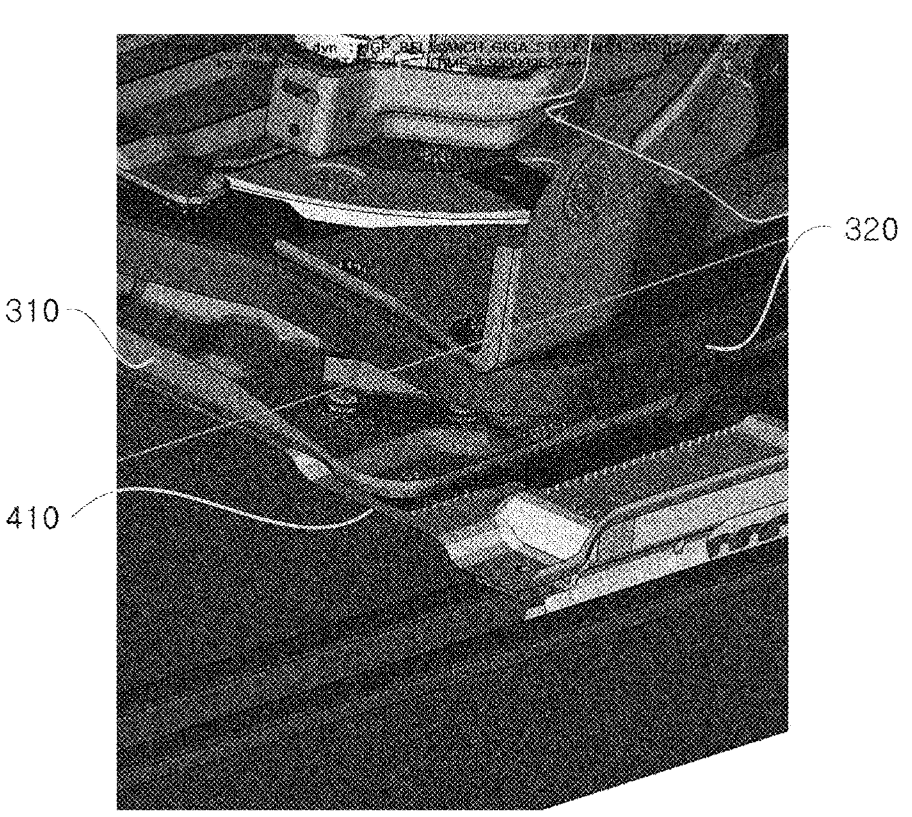
FIGS. 15A and 15B illustrate results of deformation analysis of a seat frame of the comparative example.
Figure 15B:
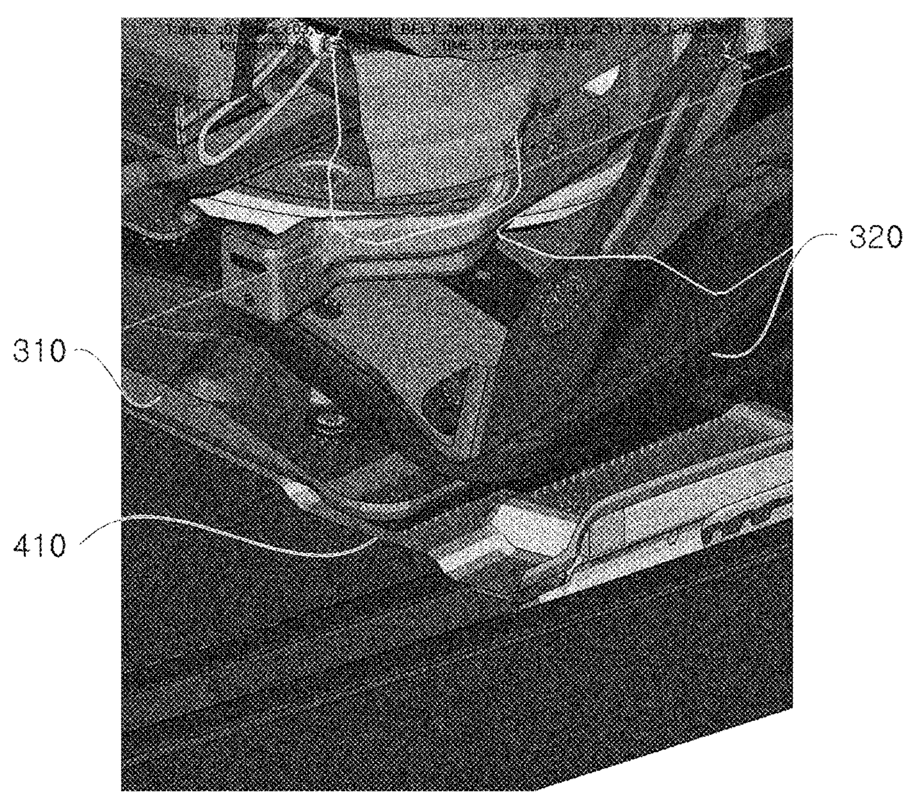

FIGS. 15A and 15B show the results of deformation analysis of the seat frame 10 of the comparative example. FIG. 15A is the initial deformation analysis result of the comparative example, and FIG. 15B is the result of the later deformation analysis of the comparative example.

Unlike the example, the comparative example has a significant difference in that it does not include the configuration of the reinforcing bead 451 of the bracket reinforcing member 450 and the like, and there is also some difference in the shape of the bracket plate 410.

In the case of an embodiment of the present disclosure, the bracket reinforcing member 450 extends in the front-to-back directions along the rail 510 and has the reinforcing bead 451 protruding upward in front of the bracket reinforcing member 450, and the reinforcing bead 451 is disposed on the lower side of the rotating plate 320 on a plane, and thus it can be seen that that excessive deformation does not occur in the rotating plate 320 of the rotating part 300 and is stably supported even in the late stage of deformation.

On the other hand, in the case of the comparative example, unlike the embodiment of the present disclosure, it does not include the configuration of the reinforcing bead 451 of the bracket reinforcing member 450 and the like, and thus it can be seen that excessive deformation occurs in the rotating plate 320 of the rotating part 300 in the late stage of deformation.

Figure 16:
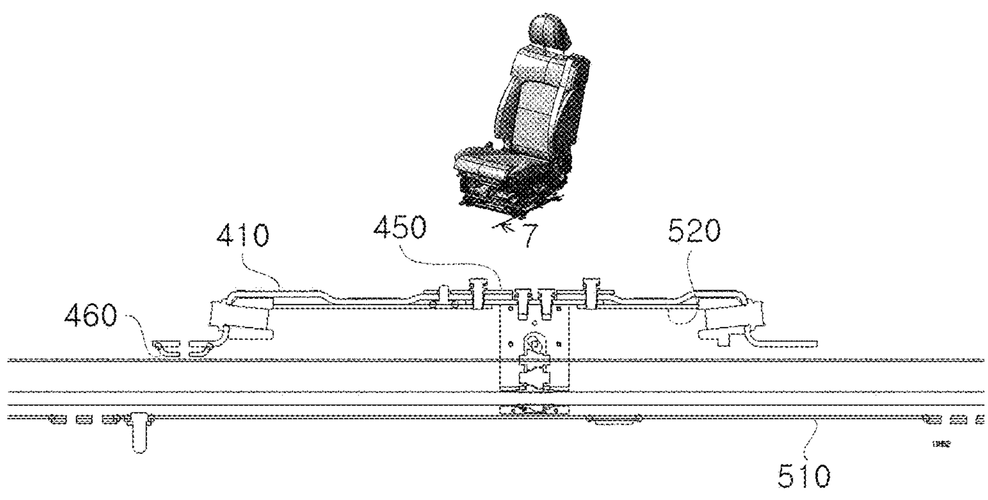
FIG. 16 is a cross-sectional view of a seat frame of the present disclosure in the '7' direction.

FIG. 16 is a cross-sectional view of the seat frame of the present disclosure in the '7' direction.

The upper side of the bracket plate 410 is reinforced by overlapping the bracket reinforcing member 450, and the slide bracket 520 may be coupled to the lower side of the bracket plate 410.

The slide bracket 520, the bracket plate 410, and the bracket reinforcing member 450 are disposed in order from the bottom to the top, and may be coupled via bolts.

A bracket plate patch 460 is coupled to the longitudinal front bottom of the bracket plate 410 to prevent excessive deformation of the bracket plate 410.

Although the embodiments of the present disclosure have been described in detail above, the scope of the present disclosure is not limited thereto. It will be apparent to those skilled in the art that various modifications and variations may be made without departing from the technical spirit of the present disclosure as set forth in the claims.

DESCRIPTION OF REFERENCE CHARACTERS

10: seat frame 20: seat back
100: cushion part 110: cushion panel
120: cushion side frame 130: cushion side patch
140: front pipe 150: rear pipe
200: height-adjusting part 210: first link
220: second link 221: second link member
222: second link bracket 300: rotating part
310: fixed plate
320: rotating plate 330: base plate
331: big gear 340: connection bracket
341: connection bottom plate 342: connection side plate
343: first connection reinforcing portion 344: second connection reinforcing portion
380: motor plate
390: motor member 391: drive gear
393: rotating gear 400: reinforcing bracket part
410: bracket plate 450: bracket reinforcing member
451: reinforcing bead 460: bracket plate patch
500: rail part 510: rail
520: slide bracket 530: motor bracket
T: belt fixture T1: seat belt buckle
T2: seat belt anchor V: seat belt

The invention claimed is:

1. A seat frame comprising:

a cushion part supporting a cushion;

a height-adjusting part installed on a lower side of the cushion part and adjusting a height of the cushion part via a plurality of rotating links;

a rotating part installed below the height-adjusting part and rotating the height-adjusting part and the cushion part; and a reinforcing bracket part coupled to a lower side of the rotating part, reinforcing the rotating part, and installed across a pair of rails of a rail part disposed on a lower side and spaced apart from each other, wherein the height-adjusting part includes, a first link connecting the rotating part and the cushion part at a front portion; and a second link connecting the rotating part and the cushion part at a rear portion, wherein the rotating part includes, a connection bracket coupled to the first link and the second link, wherein the connection bracket has a first connection reinforcing portion installed in front of the connection bracket and forming a closed cross-section with the connection bracket.

2. The seat frame of claim 1, wherein the rotating part further includes, a fixed plate disposed on a lower side;

a base plate joined to an upper side of the fixed plate; and a rotating plate rotatably installed between the fixed plate and the base plate.

3. The seat frame of claim 2, one side of the connection bracket coupled to an upper side of the rotating plate and the other side of the connection bracket coupled to the first link and the second link.

4. A seat frame comprising:

a cushion part supporting a cushion;

a height-adjusting part installed on a lower side of the cushion part and adjusting a height of the cushion part via a plurality of rotating links;

a rotating part installed below the height-adjusting part and rotating the height-adjusting part and the cushion part; and a reinforcing bracket part coupled to a lower side of the rotating part, reinforcing the rotating part, and installed across a pair of rails of a rail part disposed on a lower side and spaced apart from each other, wherein the height-adjusting part includes, a first link connecting the rotating part and the cushion part at a front portion; and a second link connecting the rotating part and the cushion part at a rear portion, wherein the rotating part includes, a connection bracket coupled to the first link and the second link, wherein the connection bracket has a second connection reinforcing portion installed at a rear portion of the connection bracket and forming a closed cross-section with the connection bracket.

5. The seat frame of claim 4, wherein the connection bracket is provided with a seat belt fixed to a rear upper side thereof, and the second connection reinforcing portion is coupled to a rear lower side of the connection bracket.

6. A seat frame comprising:

a cushion part supporting a cushion;

a height-adjusting part installed on a lower side of the cushion part and adjusting a height of the cushion part via a plurality of rotating links;

a rotating part installed below the height-adjusting part and rotating the height-adjusting part and the cushion part; and a reinforcing bracket part coupled to a lower side of the rotating part, reinforcing the rotating part, and installed across a pair of rails of a rail part disposed on a lower side and spaced apart from each other, wherein the height-adjusting part includes, a first link connecting the rotating part and the cushion part at a front portion; and a second link connecting the rotating part and the cushion part at a rear portion, wherein the rotating part includes, a fixed plate disposed on a lower side;

a base plate joined to an upper side of the fixed plate;

a rotating plate rotatably installed between the fixed plate and the base plate;

a motor plate fixed to an upper side of the rotating plate; and a motor member installed on the motor plate and equipped with a drive gear engaged with a big gear fixed to the base plate.

7. A seat frame comprising:

a cushion part supporting a cushion;

a height-adjusting part installed on a lower side of the cushion part and adjusting a height of the cushion part via a plurality of rotating links;

a rotating part installed below the height-adjusting part and rotating the height-adjusting part and the cushion part; and a reinforcing bracket part coupled to a lower side of the rotating part, reinforcing the rotating part, and installed across a pair of rails of a rail part disposed on a lower side and spaced apart from each other, wherein the height-adjusting part includes, a first link connecting the rotating part and the cushion part at a front portion; and a second link connecting the rotating part and the cushion part at a rear portion, wherein the rotating part includes, a fixed plate disposed on a lower side;

a base plate joined to an upper side of the fixed plate;

a rotating plate rotatably installed between the fixed plate and the base plate;

a bracket plate installed across the pair of rails and comprised of a single member coupled to the fixed plate; and a bracket reinforcing member coupled between the fixed plate and the bracket plate and comprised of a single member reinforcing the bracket plate.

8. The seat frame of claim 7, wherein the bracket plate is reinforced by overlapping the bracket reinforcing member on an upper side thereof, and the fixed plate of the rotating part is coupled to an upper side of the bracket reinforcing member.

9. The seat frame of claim 8, wherein the bracket plate, the bracket reinforcing member, and the fixed plate of the rotating part have lengths corresponding to each other in a front-to-back direction, and have longitudinal overlapping sections overlapping and fixed to each other in a up and down direction.

10. The seat frame of claim 7, wherein the bracket reinforcing member extends in a front-to-back direction along the rails, and has a reinforcing bead protruding upwardly in front of the bracket reinforcing member.

11. The seat frame of claim 10, wherein the reinforcing bead is disposed on a lower side of the rotating plate in a plane view.

* * * * *